United States Patent
Nardi et al.

(10) Patent No.: US 8,890,747 B2
(45) Date of Patent: Nov. 18, 2014

(54) LONGITUDINAL AND LATERAL VELOCITY ESTIMATION USING SINGLE ANTENNA GPS AND MAGNETIC COMPASS

(75) Inventors: Flavio Nardi, Farmington Hills, MI (US); Nikolai K. Moshchuk, Grosse Pointe, MI (US); Jihan Ryu, Rochester Hills, MI (US); Kevin A. O'Dea, Ann Arbor, MI (US)

(73) Assignee: GM Global Technology Operations LLC, Detroit, MI (US)

(*) Notice: Subject to any disclaimer, the term of this patent is extended or adjusted under 35 U.S.C. 154(b) by 1435 days.

(21) Appl. No.: 12/392,277

(22) Filed: Feb. 25, 2009

(65) Prior Publication Data

US 2010/0214164 A1 Aug. 26, 2010

(51) Int. Cl.
*G01S 19/53* (2010.01)
*B60T 8/172* (2006.01)
*G01S 19/40* (2010.01)
*G01S 19/45* (2010.01)
*G01S 19/52* (2010.01)

(52) U.S. Cl.
CPC ............... B60T 8/172 (2013.01); G01S 19/53 (2013.01); *B60T 2210/36* (2013.01); *B60T 2230/02* (2013.01); *G01S 19/52* (2013.01)
USPC ............. 342/357.36; 342/357.23; 342/357.28

(58) Field of Classification Search
CPC . B60T 2230/02; B60T 2210/36; B60T 8/172; G01S 19/52; G01S 19/53
USPC .............. 342/357.28, 357.23, 357.36, 357.11
See application file for complete search history.

(56) References Cited

U.S. PATENT DOCUMENTS

| | | | |
|---|---|---|---|
| 5,058,023 A | 10/1991 | Kozikaro | |
| 6,208,927 B1 * | 3/2001 | Mine et al. | 701/70 |
| 6,219,609 B1 | 4/2001 | Matsuno et al. | |
| 6,223,105 B1 * | 4/2001 | Teague | 701/13 |
| 7,230,567 B2 * | 6/2007 | Arakane et al. | 342/357.32 |
| 7,277,793 B2 * | 10/2007 | Witcraft et al. | 701/207 |
| 2003/0135327 A1 * | 7/2003 | Levine et al. | 701/220 |
| 2004/0133331 A1 | 7/2004 | Kuttler et al. | |
| 2005/0234626 A1 | 10/2005 | Shiiba et al. | |
| 2007/0203623 A1 | 8/2007 | Saunders et al. | |
| 2008/0117100 A1 | 5/2008 | Wang et al. | |
| 2008/0140137 A1 | 6/2008 | Wall, III et al. | |
| 2008/0183376 A1 | 7/2008 | Knockeart et al. | |
| 2010/0063768 A1 * | 3/2010 | Lagouge et al. | 702/154 |

OTHER PUBLICATIONS

Kuwata et al., "Magnetic Beeline—Satellite Derived Attitude for Marine Navigation", Institute of Navigation GPS '98 Meeting, Nashville, TN, Sep. 15-18, 1998.*
Airmar Technology Corporation, "GH2183", Flyer, May 10, 2010.*
Richard B. Langley, "The Magnetic Compass and GPS", GPS World, Sep. 1, 2003.*

\* cited by examiner

*Primary Examiner* — Frank J McGue

(57) ABSTRACT

A system and method is provided for determining a lateral velocity and a longitudinal velocity of a vehicle equipped. The vehicle includes only one antenna for a GPS receiver and a magnetic compass. A magnitude of a velocity vector of the vehicle is determined. A course angle with respect to a fixed reference using the single antenna GPS receiver is determined. A yaw angle of the vehicle is measured with respect to the fixed reference using a magnetic compass. A side slip angle is calculated as a function of the course angle and the yaw angle. The lateral velocity and longitudinal velocity is determined as a function of the magnitude of the velocity vector and the side slip angle.

18 Claims, 3 Drawing Sheets

LONGITUDINAL AND LATERAL VELOCITY ESTIMATION USING SINGLE ANTENNA GPS AND MAGNETIC COMPASS

BACKGROUND OF INVENTION

An embodiment relates generally to vehicle dynamics control.

Longitudinal velocity and lateral velocity are vehicle dynamic variables used by vehicle control systems. Longitudinal speed is a vehicle dynamic variable used for example by adaptive cruise control systems and anti-lock braking systems. Lateral velocity is a vehicle dynamic variable used for stability control systems.

Longitudinal and lateral velocity measurements are generally measured via wheel speed sensors, and/or lateral acceleration sensors, and/or other inertia-based sensors. Often such sensors must be calibrated for sensor bias or the use of sensors having high accuracy must be utilized.

An optical sensor or a multi-antenna global positioning system (GPS) receiver can provide longitudinal and lateral velocity measurements. Multi-antenna GPS receivers utilize at least two antennas. The antennas must be spaced from one another. The multi-antenna GPS receiver estimates vehicle position, velocity, acceleration, attitude, and angular rates at both antennas and compares them to determine lateral and longitudinal velocities. However, a two-antenna GPS receiver is expensive. Various other measurement devices described above are either costly and/or are computationally intensive for determining the longitudinal and lateral velocities of the vehicle.

SUMMARY OF INVENTION

An advantage of an embodiment is the determination of the lateral velocity and longitudinal velocity utilizing a single antenna vehicle GPS system and magnetic compass that requires simple computations.

An embodiment contemplates a method for determining a lateral velocity and a longitudinal velocity of a vehicle. The vehicle includes only one antenna for a GPS receiver and a magnetic compass. The magnitude of the velocity vector of the vehicle is determined using the single antenna GPS receiver. A course angle with respect to a fixed reference (i.e., an inertial (earth fixed) reference frame) using the single antenna GPS receiver is determined. A yaw angle of the vehicle is measured with respect to the fixed reference (i.e., an inertial (earth fixed) reference frame) using a magnetic compass). A side slip angle is calculated as a function of the course angle and the yaw angle. The lateral velocity and longitudinal velocity is determined as a function of the magnitude of the velocity vector and the side slip angle.

An embodiment contemplates a method for determining lateral velocity and longitudinal velocity of a vehicle equipped with a single antenna GPS receiver and a magnetic compass. A velocity of the vehicle is determined. A direction of travel of a predetermined point using GPS on the vehicle is determined. A longitudinal orientation of the vehicle is measured using a magnetic compass. The lateral velocity and longitudinal velocity are determined each as a function of the magnitude of the velocity vector, and an angle between the direction of travel and the longitudinal orientation.

DETAILED DESCRIPTION

Figure 1:
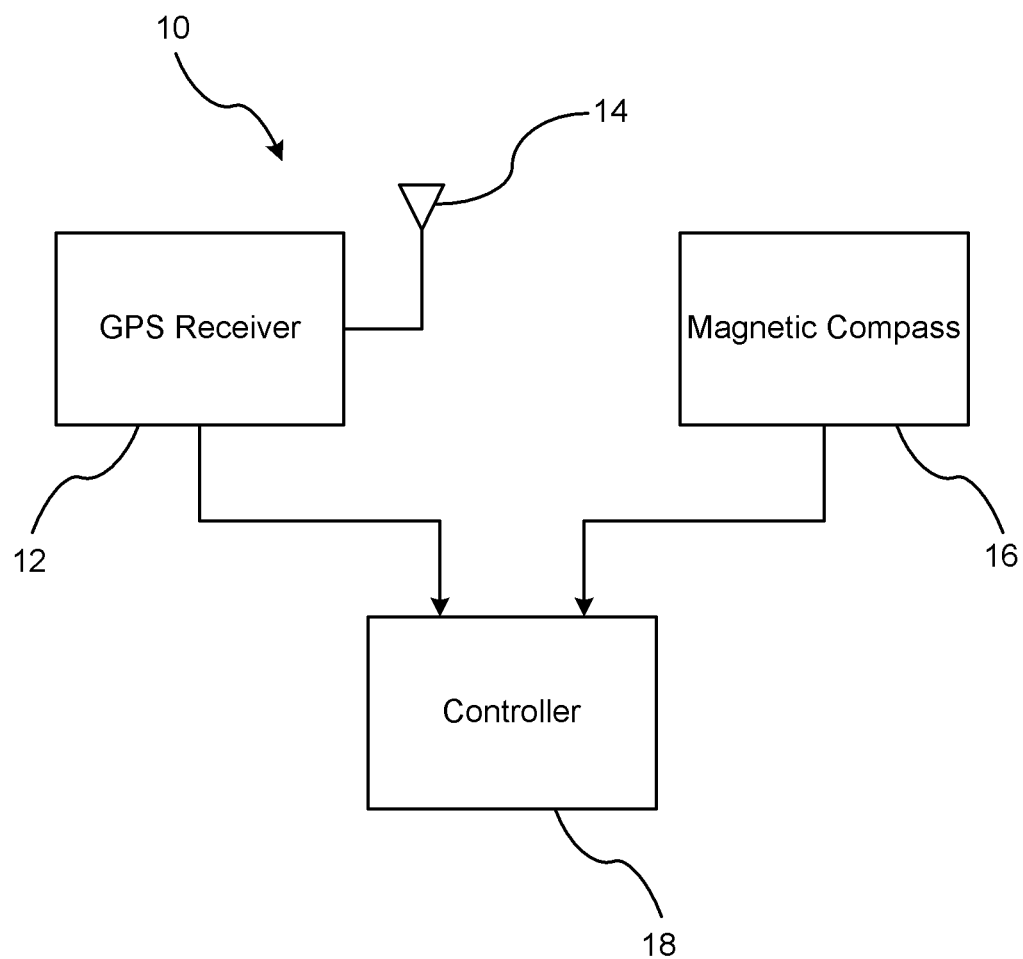
FIG. 1 is a block diagram of the GPS assisted vehicular longitudinal and lateral velocity determination system.

There is shown in FIG. 1 a block diagram of a GPS assisted vehicular longitudinal and lateral velocity determination system 10. The system 10 is used to determine a vehicle lateral velocity and a longitudinal velocity of a vehicle. Longitudinal velocity is a velocity of a vehicle as it moves in a forward direction. Lateral velocity is a speed of a lateral movement of a vehicle as it transitions through a turn or travels along a curved path. Various devices and methods have been used to determine both lateral and longitudinal velocities, but such devices may include costly sensors, are computationally complex, or provide data with errors.

Figure 2:
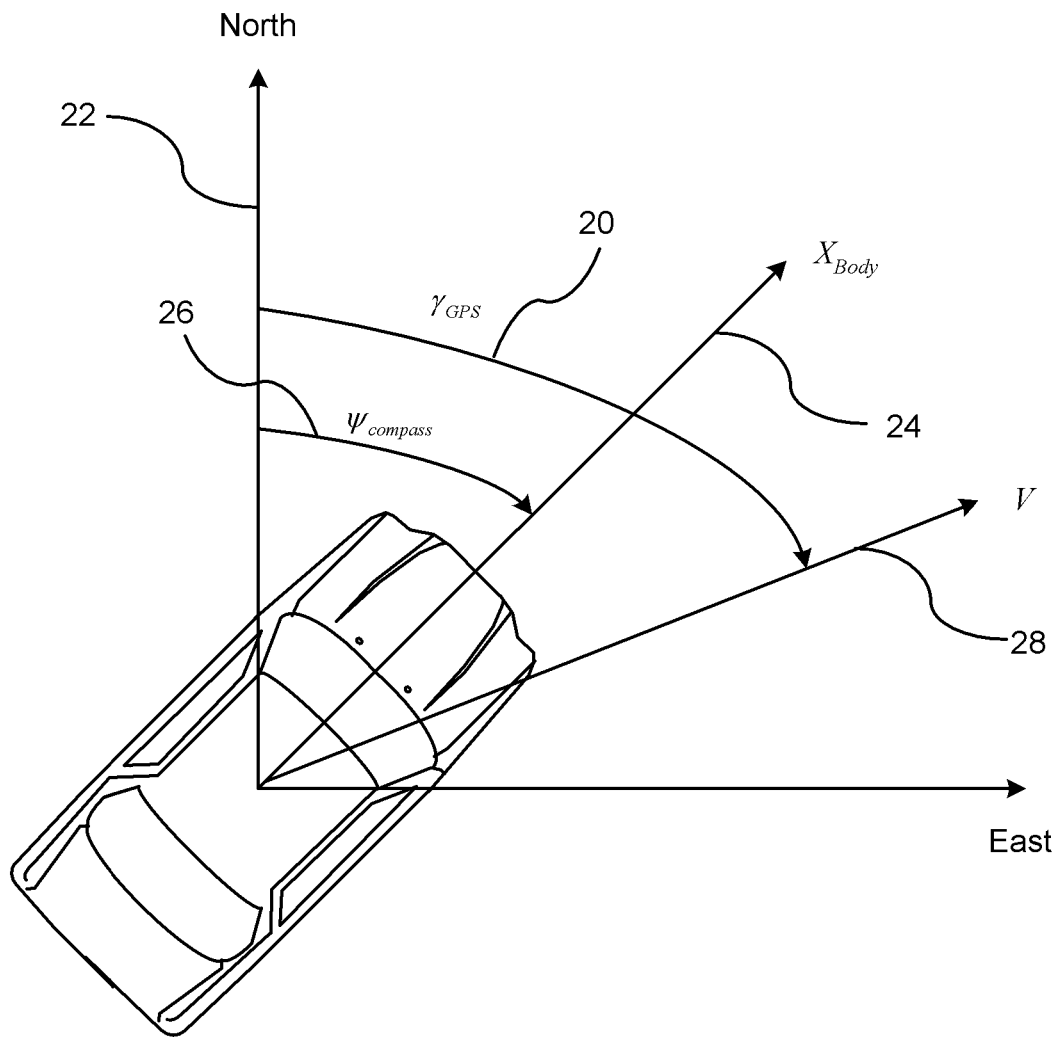
FIG. 2 is a positional view of a vehicle illustrating yaw and course angle travel of a vehicle.

FIGS. 1-2 will be used in cooperation to describe the system 10 and the various directional measurements obtained by the system 10. The system 10 includes a GPS receiver 12 coupled to a single antenna 14, a magnetic compass 16, and a controller 18.

The GPS receiver 12 utilizes a constellation of satellites that transmit signals which enable the GPS receiver 12 of a vehicle to determine the vehicle's location, speed, direction, and time. Based on the GPS data, a course angle ($\gamma_{GPS}$) 20 is determined. The course angle 20 is a direction of travel over a surface of the Earth with respect to a predetermined point which is typically the north pole. That is, the course angle is expressed as the angle measured from a virtual vector pointing due North 22 to a direction of travel of the vehicle which is represented by a centerline of the body axis ($X_{Body}$) 24. The course angle 20 is the angular difference between the virtual vector pointing due North 22 and a vehicle's heading (V) 28.

A magnetic compass 16 is provided for measuring a yaw angle ($\Psi_{Compass}$) 26. The yaw angle 26 is defined as an angle between a centerline of the body axis ($X_{Body}$) 24 and reference heading (i.e., the virtual vector pointing due North 22). The magnetic compass 16 may include a digital magnetic compass for obtaining fast response times and being unaffected by sudden vehicle movement and environmental conditions. Additional integrated inertial sensors may be used to remove the effects of such conditions. The magnetic compass 16 may be integrated with the GPS receiver 12 as a single unit or as part of a single chip. Whether a magnetic compass 16 and the GPS receiver 12 are integrated or non-integrated, one antenna is only required for the determination of the longitudinal velocity and lateral velocity.

A controller 18 is in communication with the GPS receiver 12 and the magnetic compass 16. The controller 18 determines a side slip angle as a function of the course angle and yaw angle. The controller 18 may be a stand-alone controller or may be a controller that is part of another system since minimal computations and processing are required. For example, a controller may include, but is not limited to, the controller of a GPS receiver, a digital magnetic compass, an electronic control unit, or a body control unit.

The side slip angle is a deviation of the vehicle's centerline from its original path of travel to its displaced path of travel as the vehicle transitions through a curve or turn. The controller 18 determines the side slip angle by the difference between the course angle 20 and the yaw angle 26. The side slip angle is represented by the following equation:

$$\beta = \gamma_{GPS} - \Psi_{Compass} \qquad (1)$$

where β is the side slip angle, $\gamma_{GPS}$ is the course angle, and $\Psi_{Compass}$ is yaw angle.

Once the side slip angle is determined, the longitudinal velocity and the lateral velocity may be determined as a function of the side slip angle β and vehicle speed V using trigonometric functions.

The formula for determining the longitudinal velocity $v_x$ is represented by:

$$v_x = |V|\cos \beta \qquad (2)$$

where $v_x$ is the longitudinal velocity, V is the vehicle velocity, and β is the side slip angle.

The formula for determining the lateral velocity $v_y$ is represented by:

$$v_y = |V|\sin \beta \qquad (3)$$

where $v_y$ is the lateral velocity, V the vehicle velocity, and β is the sides slip angle.

As a result, longitudinal velocity $v_x$ and lateral velocity $v_y$ may be easily calculated utilizing non-complex equations which may be computed in a time efficient manner resulting in fast response times.

Figure 3:
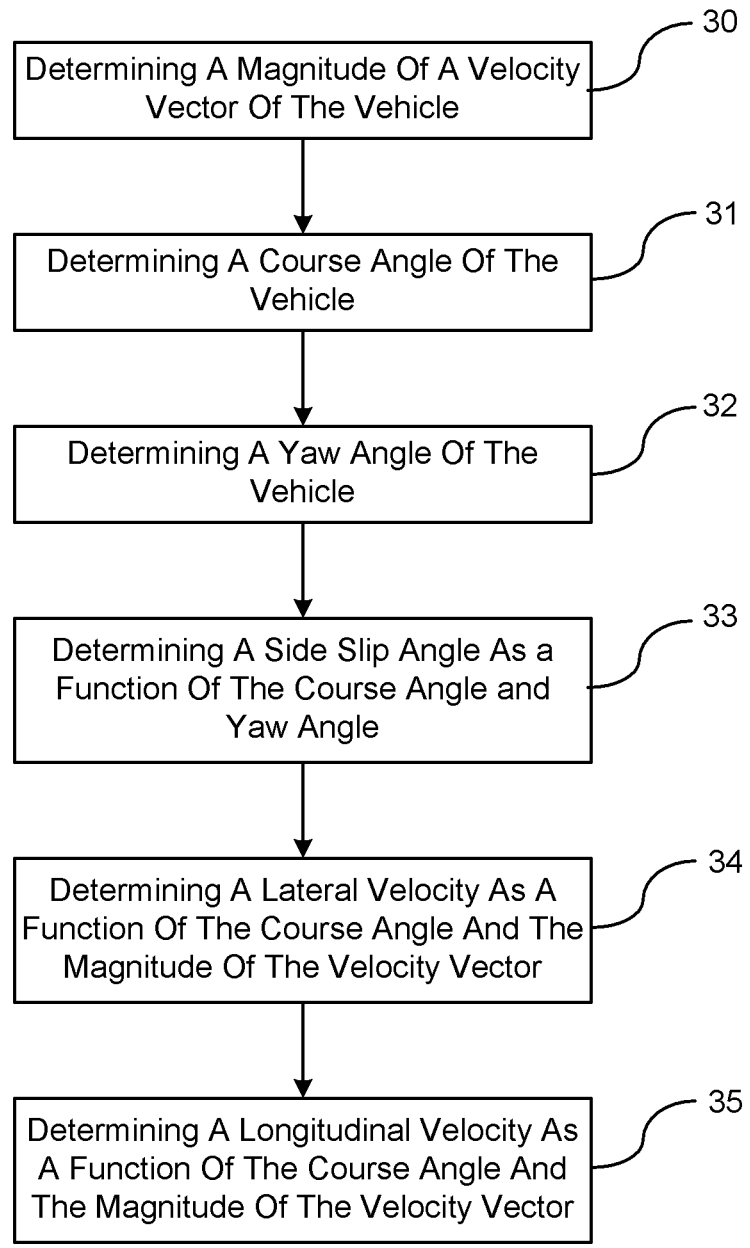
FIG. 3 is a flowchart of a method for determining vehicle dynamic variables.

FIG. 3 illustrates a flowchart of a method for determining the lateral velocity and longitudinal velocity of the vehicle. In step 30, the vehicle speed of the vehicle is determined (i.e., magnitude of a velocity vector). The vehicle speed may be determined using various devices which may include, but is not limited to, GPS data, a wheel speed sensor, or engine control unit data.

In step 31, a course angle of the vehicle is determined. The course angle is determined based on the GPS data. The course angle is the direction of travel over a surface of the Earth with respect to a predetermined point which is typically the vector pointing due North.

In step 32, a yaw angle of the vehicle is determined. The yaw angle is determined using a magnetic compass. The yaw angle is the angle between a centerline of the body axis ($X_{Body}$) 24 and a due North reference heading. A digital compass may be used which is unaffected by sudden vehicle movements and environmental conditions.

In step 33, the side slip angle is determined by calculating the difference between the course angle as determined by the single antenna GPS receiver and the yaw angle as determined by the magnetic compass.

In step 34, a lateral velocity is determined as a function of the course angle and the magnitude of the speed by the formula represented in eq. (2).

In step 34, a longitudinal velocity is determined as a function of the yaw angle and the magnitude of the speed by the formula represented in eq. (3).

While certain embodiments of the present invention have been described in detail, those familiar with the art to which this invention relates will recognize various alternative designs and embodiments for practicing the invention as defined by the following claims.

What is claimed is:

1. A method for determining lateral velocity and longitudinal velocity of a vehicle equipped with a single antenna GPS receiver and a magnetic compass, the method comprising the steps of:
    determining a velocity of the vehicle;
    determining a direction of travel in relation to a predetermined point on the vehicle using GPS;
    measuring a longitudinal orientation of the vehicle using a magnetic compass; and
    determining the lateral velocity and longitudinal velocity each as a function of the magnitude of the velocity vector, and an angle between the direction of travel and the longitudinal orientation.

2. The method of claim 1 wherein the angle is a side slip angle determined as a function of the determined direction of travel in relation to the predetermined point and the longitudinal orientation of the vehicle, the side slip angle being represented by the following formula:

$$\beta = \gamma - \psi$$

where β is the side slip angle, γ is the determined direction of travel in relation to the predetermined point, and ψ is the longitudinal orientation of the vehicle.

3. The method of claim 2 wherein the longitudinal velocity is determined by the following formula:

$$v_x = |V|\cos \beta$$

where $v_x$ is the longitudinal velocity, and V is the velocity of the vehicle.

4. The method of claim 2 wherein the lateral velocity is determined by the following formula:

$$v_y = |V|\sin \beta$$

where $v_y$ is the lateral velocity, and V is the velocity of the vehicle.

5. The method of claim 1 wherein the longitudinal orientation of the vehicle body is measured using a digital magnetic compass.

6. The method of claim 1 wherein the predetermined point used to determine direction of travel includes a reference vector pointing due North.

7. A method for determining a lateral velocity and a longitudinal velocity of a vehicle equipped, the vehicle including only one antenna for a GPS receiver and a magnetic compass, the method comprising the steps of:
    determining a magnitude of a velocity vector of the vehicle;
    determining a course angle with respect to a fixed reference using the single antenna GPS receiver;
    measuring a yaw angle of the vehicle with respect to the fixed reference using a magnetic compass;
    calculating a side slip angle as a function of the course angle and the yaw angle; and
    determining the lateral velocity and longitudinal velocity as a function of the magnitude of the velocity vector and the side slip angle.

8. The method of claim 7 wherein the side slip angle is determined as a function of the course angle and the yaw angle, the side slip angle being represented by the following formula:

$$\beta = \gamma - \psi$$

where β is the side slip angle, γ is the course angle, and ψ is the yaw angle of the vehicle body.

9. The method of claim 2 wherein the longitudinal velocity is determined by the following formula:

$$v_x = |V|\cos \beta$$

where $v_x$ is the longitudinal velocity, and V is the velocity vector.

10. The method of claim 2 wherein the lateral velocity is determined by the following formula:

$$v_y = |V|\sin \beta$$

where $v_y$ is the lateral velocity, and V is the velocity vector.

11. A vehicle dynamic control system for determining vehicle dynamic parameters for a vehicle, the system comprising:

a global positioning system (GPS) receiver having only a single antenna, the GPS receiver receiving course angle data of the vehicle;
a magnetic compass for providing yaw angle data of the vehicle; and
a controller determining a side slip angle in response to the yaw angle data and the course angle data;
wherein the controller determines a longitudinal velocity and a lateral velocity as a function of the side slip angle.

12. The system of claim 11 wherein the magnetic compass is integrated with the GPS receiver.

13. The system of claim 11 further comprising a speed sensor for providing speed data to the controller for determining the longitudinal velocity and the lateral velocity.

14. The system of claim 11 where the GPS receiver determines a vehicle speed.

15. The system of claim 11 wherein the controller determines a slide slip angle of the vehicle utilizing the following formula:

$$\beta = \gamma - \psi$$

where $\beta$ is the side slip angle, $\gamma$ is the azimuth angle of the velocity vector, and $\psi$ is the azimuth angle of the vehicle body.

16. The system of claim 15 wherein the longitudinal velocity is determined by the controller using the following formula:

$$v_x = |V|\cos\beta$$

where $v_x$ is the longitudinal velocity, and V is the velocity of the vehicle.

17. The system of claim 15 wherein the lateral velocity is determined by the controller using the following formula:

$$v_y = |V|\sin\beta$$

where $v_y$ is the lateral velocity, and V is the velocity of the vehicle.

18. The system of claim 11 wherein the magnetic compass is a digital magnetic compass.

* * * * *